United States Patent

[11] 3,630,032

| [72] | Inventor | Lewis M. D. Grainger<br>Route 1, Glen Allen, Va. 23060 |
|---|---|---|
| [21] | Appl. No. | 69,866 |
| [22] | Filed | Sept. 4, 1970 |
| [45] | Patented | Dec. 28, 1971<br>Continuation of application Ser. No.<br>27,251, Apr. 10, 1970. This application<br>Sept. 4, 1970, Ser. No. 69,866 |

[54] ANTIPOLLUTION SYSTEM FOR INTERNAL COMBUSTION ENGINES
6 Claims, 6 Drawing Figs.

[52] U.S. Cl. .................................................. 60/308, 60/298
[51] Int. Cl. .................................................. F01n 3/10
[50] Field of Search .................................................. 60/30 R

[56] References Cited
UNITED STATES PATENTS

| 939,844 | 11/1909 | Lehmann .................. | 60/30 R |
| 1,897,746 | 2/1933 | Winslow .................... | 60/30 R |
| 2,216,653 | 10/1940 | Sauer ....................... | 60/30 R |
| 2,649,685 | 8/1953 | Cohen ....................... | 60/30 R |
| 2,829,731 | 4/1958 | Clayton ..................... | 60/30 R |

*Primary Examiner*—Douglas Hart
*Attorney*—Elton H. Brown, Jr.

ABSTRACT: An antipollution system for internal combustion engines in which the air pollutants in the exhaust gases are completely burned to produce an exhaust gas from the engine which is substantially free of air polluting materials. An air injector is positioned in the exhaust stream to provide the necessary oxygen to burn the pollutants. The exhaust gases are fed through an air injector and combustion chamber unit which is heated by the exhaust gases and remains at a relatively high temperature while the engine is operating so as to complete the burning of all air polluting materials contained in the exhaust gases in the presences of the supplied air. The air is forced fed by any desired blower and optionally includes air extracted from the crank case in engines so equipped. The air may be preheated by contact with the exhaust manifold in one form of the invention and may be entrained with the exhaust gases before reaching the combustion chamber unit in another form of the invention.

INVENTOR.
LEWIS M. D. GRAINGER,
BY
Elton H. Brown Jr.

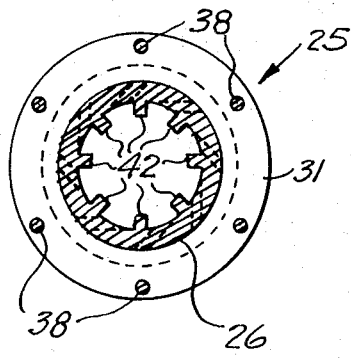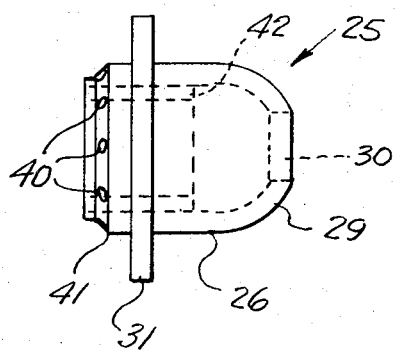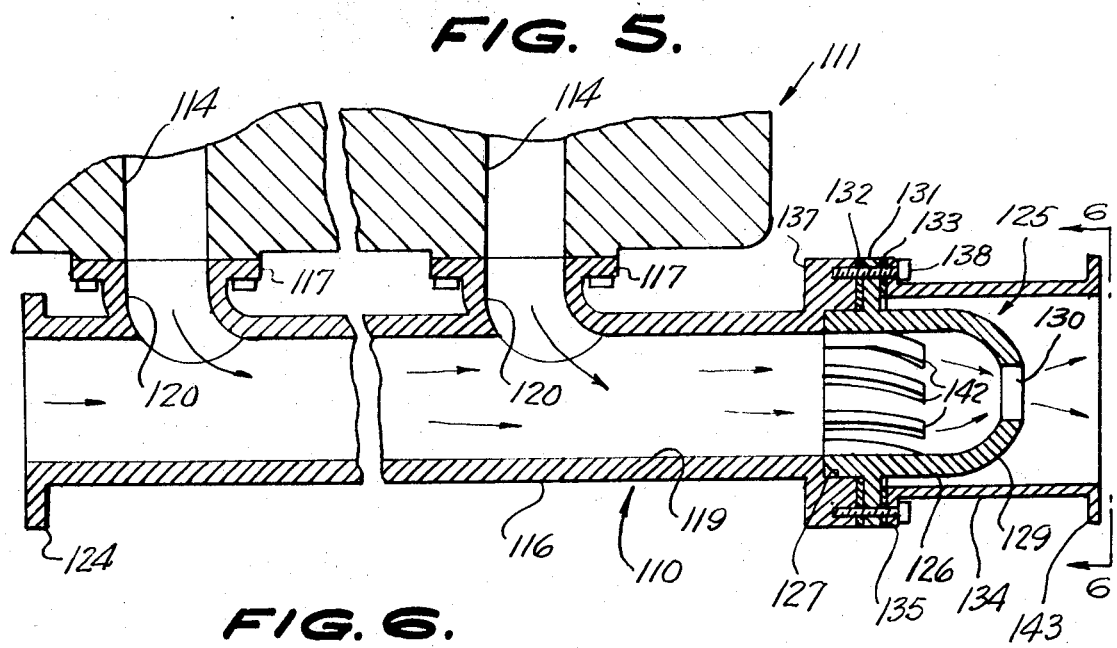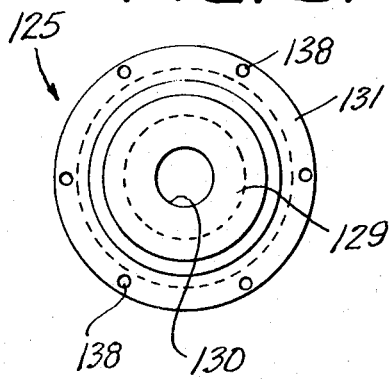

1

ANTIPOLLUTION SYSTEM FOR INTERNAL COMBUSTION ENGINES

CROSS-REFERENCE TO RELATED APPLICATIONS

The present invention is a continuation-in-part of my copending application Ser. No. 27,251 filed Apr. 10, 1970 and entitled "Antipollution System for Internal Combustion Engines."

The system of the present application is adapted to be used with the system of my copending application Ser. No. 46,938 filed June 17, 1970 and entitled "Antipollution System for Internal Combustion Engines." While the systems of the present application and application Ser. No. 46,938 are adapted to be connected together and used with the single engine it should be understood that either system may be used alone.

BACKGROUND OF THE INVENTION

Field of the Invention

The present invention is directed to the elimination of air polluting materials in the exhaust gas stream from the internal combustion engine, by burning completely such pollutants.

SUMMARY OF THE INVENTION

The present invention relates to the elimination of air pollutant materials from an internal combustion engine exhaust stream by supplying additional air to the exhaust gas and completely burning the pollutants prior to admission to the atmosphere.

The primary object of the invention is to provide a system for attachment to an internal combustion engine to supply air to the exhaust stream and to consume the air pollutants in a combustion chamber.

Other objects and advantages will become apparent in the following specification when considered in the light of the attached drawings.

BRIEF DESCRIPTION OF THE DRAWINGS

FIG. 3 is a transverse sectional view taken along the line 3—3 of FIG. 2, looking in the direction of the arrows;

FIG. 4 is a side elevational view of the combustion chamber illustrated in FIGS. 1 through 3;

FIG. 5 is a similar to FIG. 2 of a modified form of the invention; and

FIG. 6 is an end elevational view as viewed from line 6—6 of FIG. 5, looking in the direction of the arrows.

DESCRIPTION OF THE PREFERRED EMBODIMENT

Figure 1:
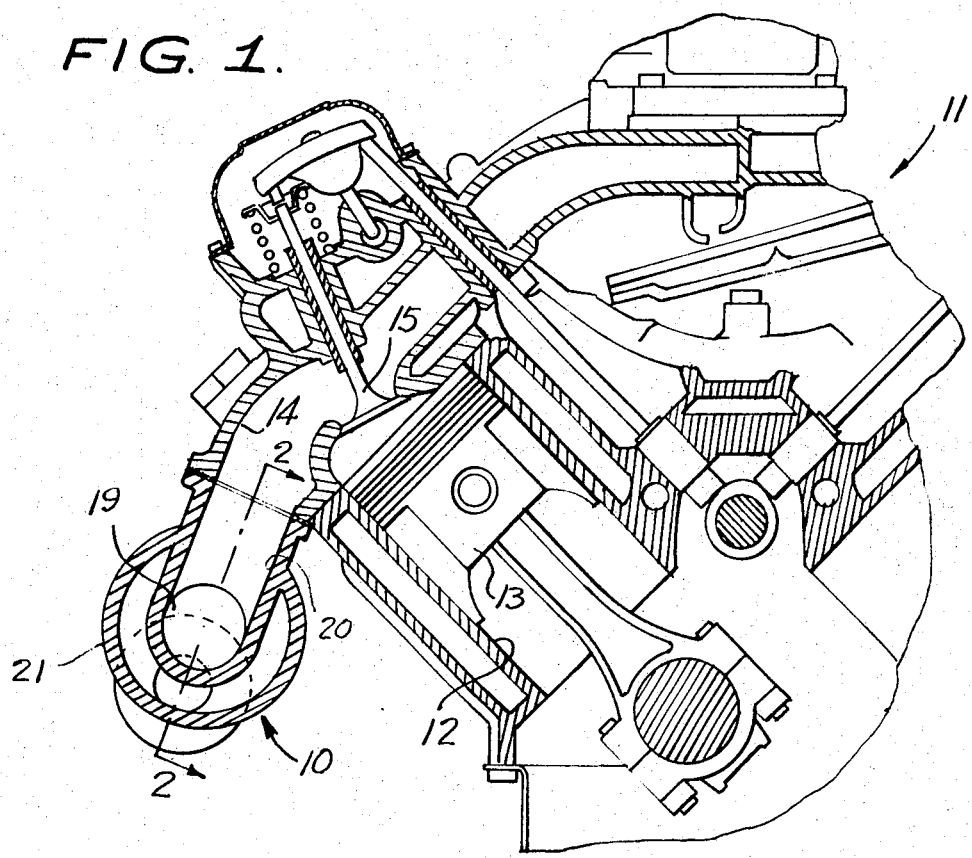
FIG. 1 is a transverse section through a V-type automobile engine showing the invention attached thereto with parts broken away for convenience of illustration.

Referring now to the drawings in detail wherein like reference characters indicate like parts throughout the several figures the reference numeral 10 indicates generally an antipollution system for internal combustion engines indicated generally at 11 constructed in accordance with the invention.

The internal combustion engine 11 is of conventional design having one or more cylinders 12 each having a reciprocating piston 13 therein. An exhaust passage 14 controlled by an exhaust valve 15 conventionally permits exhaust gases to pass from the cylinder 12. The system 10 replaces the conventional exhaust manifold (not shown) of the engine 11. While the engine 11 has been illustrated as a V-type such as a V-8 engine it should be understood that the system 10 can be adapted for use with any and all types of internal combustion engines from simple one cylinder engines up to and including massive multicylinder V-type engines.

The system 10 includes a casting generally indicated at 16 provided with a plurality of flanges 17 secured to the engine 11 by stud bolts 18. A casting 16 has a central exhaust conduit 19 extending therethrough with individual exhaust conduits 20 communicating therewith and with the exhaust passages 14 of the engine 11.

A conduit 21 encompasses the conduit 19 and is arranged in outwardly spaced relation thereto to provide an air passage 22 surrounding the exhaust conduit 19. An air conduit 23 communicates with the front end of the air passage 22 and has a flange 24 formed on its forward end.

The flange 24 is adapted to be secured to a conduit (not shown) leading to any source of air under pressure desired such as a blower, air compressor or the like and may be attached to the blower of my copending application Ser. No. 46,938 identified above so as to supply both air and crank case fumes the air conduit 23.

An air injector and combustion chamber unit 25 has a generally cylindrical body 26 which extends at its inner end into a annular recess 27 formed in the rear end of the exhaust conduit 19. A heat resistant sealing gasket 28 is positioned between the inner end of the body 26 and the conduit 19.

The outer end of the body 26 curves inwardly at 29 and has a central aperture 30 formed therein of a diameter substantially less than that of the cylindrical body 26. An annular flange 31 is integrally formed on the body 26 extending radially outwardly therefrom adjacent to but spaced from the inner end of the body 26.

Sealing gaskets 32, 33 engage the opposite side faces of the flange 31 for reasons to be assigned. An exhaust pipe extension 34 of generally cylindrical form is arranged in outwardly spaced relation to the body 26 and has a flange 35 on one end thereof for engagement with the sealing gasket 33. A flange 37 is formed on the rear end of the air conduit 21 and the gasket 32 engages thereagainst. Stud bolts 38 extend through the flange 35, gasket 33, flange 31, gasket 32 into the flange 37 to secure the conduit 34 and the unit 25 to the casting 16.

The flange 37 has an annular chamber 39 formed therein communicating with the end portion of the body 26 completely therearound. A plurality of air injector bores 40 extend inwardly and forwardly from a conical end wall 41 on the body 26 into the open central portion of the body 26. The air injector bores 40 permit a flow of air from the chamber 39 into the body 26. The bores 40 are arranged so as to slope rearwardly with respect to the engine 11 and extend inwardly at an angle to the radius of the body 26 intersecting the open central portion of the body 26 tangentially. A plurality of spiral vanes 42 are formed in the body 26 at the inner end thereof to provide a swiveling action for the exhaust gases passing therethrough.

The gaskets 28, 32, and 33 are formed of nonmetallic heat-resistant material of conventional construction.

Figure 2:
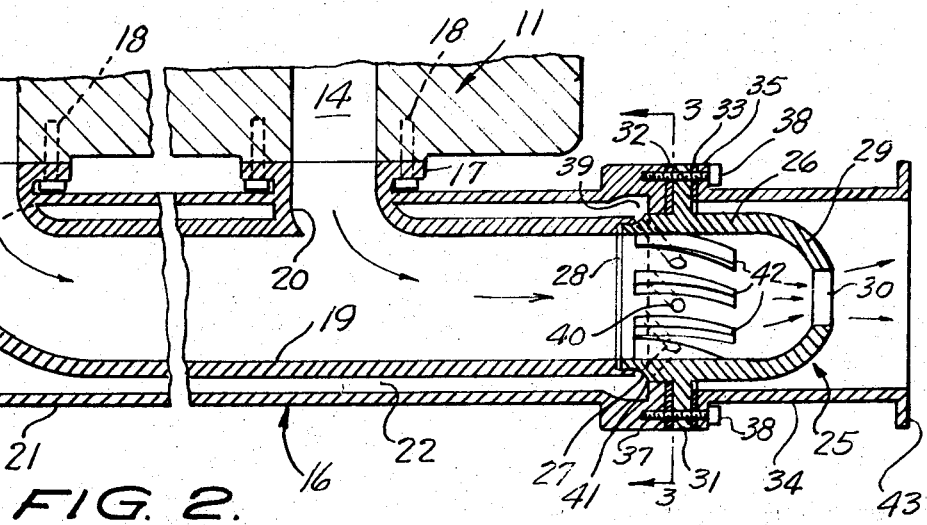
FIG. 2 is a longitudinal sectional view taken along the line 2—2 of FIG. 1, looking in the direction of the arrows with parts broken away for convenience of illustration.

In the use and operation of the invention illustrated in FIGS. 1 through 4 the internal combustion engine 11 is operated in the normal manner with its exhaust gases passing downwardly through the exhaust passage 14 and into the exhaust passages 20, and conduit 19 of the casting 16. THe exhaust gases then pass to the unit 25 where the spiral vanes 42 cause these gases to swivel as they pass therethrough mixing completely with he air being forced inwardly through the bores 40. The relatively smaller bore 30 regulates the flow of the exhaust gases so that they are retained momentarily in the unit 25 where all polluting materials are burned. The unit 25 is heated by the exhaust gases and pressure supplied air and remains at a high heat to assist in the burning of the pollutants in the exhaust gases. The gaskets 28, 32 and 33 are poor conductors of heat and hence the heat of the unit 25 is not dissipated through the engine 11. It should be noted that the unit 25 is spaced inwardly from the conduit 34 to further eliminate the dissipation of the heat.

The conduit 34 is provided with a flange 43 to permit the attachment of a conventional exhaust pipe system thereto.

It should be understood that either atmospheric air, crankcase ventilation air, or combinations of atmospheric air and crankcase ventilation air may be supplied to the air conduit 23 as desired.

A modified form of the invention is illustrated in FIGS. 5 and 6 including an antipollution system 110 adapted for use with an internal combustion engine indicated generally at 111. The internal combustion engine 111 is of any conventional construction which includes exhaust passages 114. The system 110 includes a casting 116 having a plurality of flanges 117 formed thereon for connection to the engine 111 as a replacement for the conventional exhaust manifold (not shown) thereof. A central conduit 119 extends through the casting 116 and a plurality of exhaust conduits 120 communicate the conduit 119 with the exhaust passage 114 of the engine 111. The casting 116 has an annular flange 124 formed on its forward end for connection to a source of air under pressure (not shown). It should be understood that the source of air under pressure may be the blower of my copending application Ser. No. 46,938 or any other suitable device and may supply atmospheric air, crank case vent air, or combinations of atmospheric air and crank case vent air as desired.

A combustion chamber unit 125 has a generally cylindrical body 126 which extends at its inner end into a counter bore 127 formed in the rear end of the conduit 119. The rear end of the body 126 curves inwardly at 129 and has a central aperture 130 formed therein of a diameter substantially less than that of the cylindrical body 126.

An annular flange 131 is formed on the body 126 and has nonmetallic heat resisting gaskets 132, 133 engaged against the opposite side faces thereof. An exhaust conduit 134 is arranged in outwardly spaced relation to the body 126 and has an annular flange 135 formed on one end thereof engaged against the gasket 133.

An annular flange 137 is formed on the rear end of the casting 116 and a plurality of bolts 138 extend through the flange 135, gasket 133, flange 131, gasket 132 into the flange 137 to secure the conduit 134 and the unit 125 to the casting 116. A plurality of spiral vanes 142 are formed in the body 126 at the inner end thereof to provide a swiveling action for the exhaust gases and air passing therethrough.

A flange 143 is formed on the rear end of the conduit 134 to permit the connection of the conduit 134 to the conventional exhaust pipe (not shown).

In the use and operation of the modified form of the invention illustrated in FIGS. 5 and 6 the casting 116 is connected at its forward end by use of the flange 124 to a source of air under pressure (not shown) if desired such as a lower, air compressor or the like and may be attached to the blower of my copending application Ser. No. 46,938 identified above so as to supply both air and crank case fumes to the conduit 119. Air under pressure flowing through the conduit 119 mixes with exhaust gases flowing from the engine 111 through the ports 120 and is thoroughly mixed by the swiveling action created by the vanes 142 in the unit 125. The relatively smaller bore 130 of the unit 125 regulates the flow of the exhaust gases and air so that they are retained momentarily in the unit 125 where all polluting materials are burned. The unit 125 is heated by the exhaust gases and pressure supplied air and remains at a high heat to assist in the burning of the pollutants in the exhaust gases. It should be noted that the cylindrical body 126 of the unit 125 is spaced inwardly from the conduit 134 to assist in eliminating the dissipation of heat from the body 126.

The combustion chamber units 25 and 125 are formed of heat-resistant metal. The exhaust pipe extension 34 and the exhaust conduit 134 are formed of heat-resistant metal to receive the extremely hot gaseous materials from the units 25 and 125 and form part of the systems 10 and 110 respectively.

Having thus described the preferred embodiments of the invention it should be understood that numerous structural modifications and adaptations may be resorted to without departing from the spirit of the invention.

What is claimed is:

1. An antipollution system for internal combustion engines of the type which includes exhaust passages, an elongate exhaust conduit secured to said engine and communicating with exhaust passages thereof, an air conduit surrounding said exhaust conduit and having means for connecting said air conduit to a source of air under pressure, an air injector and combustion chamber unit secured to said air conduit and communicating with said exhaust conduit, a plurality of bores extending through said unit to conduct air from said air conduit into said unit with said bores sloping to direct air rearwardly and spirally in said unit, an annular flange formed on said unit adjacent to but spaced rearwardly from the forward end of said unit, and means for securing said annular flange to the rear end of said air conduit.

2. A device as claimed in claim 1 wherein means are provided in said unit for directing the exhaust gases and air passing therethrough in a spiral path.

3. A device as claimed in claim 2 wherein said means includes a plurality of spiral vanes integrally formed in said unit.

4. A device as claimed in claim 1 wherein a plurality of heat-resistant nonmetallic gaskets are interposed between said unit, said air conduit, and said exhaust conduit.

5. An antipollution system for internal combustion engines of the type which includes exhaust passages comprising an elongate conduit secured to said engine, said conduit including means for communicating said conduit with said exhaust passages, means on the forward end of said conduit for connecting said conduit to a source of air under pressure, an annular flange integrally formed on the rear end of said conduit, a combustion chamber unit having a generally cylindrical hollow body, an annular flange integrally formed on the outer surface of said unit, a plurality of spiral vanes integrally formed in said unit, for completely mixing the air and exhaust gases passing therethrough, means for securing said annular flange to the flange on the rear end of said elongate conduit, and means at the rear end of said unit for momentarily retarding the flow of air and exhaust gases therethrough to permit the complete burning of the pollutants therein.

6. A device as claimed in claim 5 wherein said last named means includes a restricted passageway integrally formed on the rear end of said body.

* * * * *